United States Patent [19]

George et al.

[11] Patent Number: 5,768,572

[45] Date of Patent: Jun. 16, 1998

[54] TIMER STATE CONTROL OPTIMIZED FOR FREQUENT CANCEL AND RESET OPERATIONS

[75] Inventors: David Glenn George; Samuel Reynolds, both of Cary, N.C.

[73] Assignee: International Business Machines Corporation, Armonk, N.Y.

[21] Appl. No.: 595,462

[22] Filed: Feb. 5, 1996

[51] Int. Cl.[6] ............................................ G06F 1/14
[52] U.S. Cl. .................................. 395/557; 395/559
[58] Field of Search .......................... 395/553, 557, 395/559, 670, 672, 673, 676, 677

[56] References Cited

U.S. PATENT DOCUMENTS

| 4,589,093 | 5/1986 | Ippolito et al. | 364/900 |
|---|---|---|---|
| 4,908,750 | 3/1990 | Jablow | 364/200 |
| 5,193,186 | 3/1993 | Tamaki et al. | 395/650 |
| 5,386,561 | 1/1995 | Huynh et al. | 395/650 |
| 5,533,020 | 7/1996 | Byrn et al. | 370/60.1 |

*Primary Examiner*—Dennis M. Butler
*Attorney, Agent, or Firm*—Jeanine S. Ray-Yarletts

[57] ABSTRACT

A timing control mechanism designed for a high performance network wherein many of the timers are cancelled or reset prior to expiring. This method and apparatus enable the cancels and resets to occur with minimal impact to the system performance. An intermediate work queue is used, where timer events are posted prior to being scheduled into the timer queues by the timer process. Thus, many of the cancels or resets will be implemented simply by changing the status of events in this work queue, minimizing the impact on the timer queues and timers. The timer process processes the work queue before processing any timer events.

3 Claims, 12 Drawing Sheets

FIG. 4    Relationship between Protocol Layers

TIMER STATE CONTROL OPTIMIZED FOR FREQUENT CANCEL AND RESET OPERATIONS

FIELD OF THE INVENTION

This invention relates to telecommunications network timing mechanisms in software. More specifically, the invention relates to a multi-class periodic timer implementation for multi-processor systems in a telecommunications network where the timer queuing mechanisms are optimized to minimize the overhead required to cancel and reset events.

BACKGROUND OF THE INVENTION

High Performance Routing (HPR) is a new transport level protocol used in SNA/APPN (Systems Network Architecture/Advanced Peer-to-Peer Networking) networks. One of the most significant features in HPR is end-to-end adaptive rate based flow control(ARB), which replaces window based flow control used in prior implementations of the SNA architecture. HPR also provides end-to-end error recovery and path switching mechanisms. For additional information on HPR, see APPN High Performance Routing Architecture Reference. IBM publication number SV40-1018 which is also accessible from the world wide web at /pub/aiw/appn/hpr/hpr5.psbin. Each HPR connection, in implementing the different features, can make multiple concurrent periodic timer requests. Further, timer requests for the different features can occur at different frequencies.

The introduction of the HPR function into large hosts (390 hosts in the preferred embodiment) introduced the requirement of maintaining a large number of timers (over 1000), most of which are very short duration (less than 100 milliseconds). Additional complexities were added by the host processors having multi-processor capabilities where it is uncertain which processor will be handling the next execution of the program or the next timing request. Timer requests can be broken down into timer classes based on the frequency of timer requests. At one extreme, a timer class can be characterized by having a low number of outstanding timer requests but occurring at a relatively high frequency. At the other extreme, a timer class can have a very large number of outstanding requests but with a relatively large interval between requests (hence, a low frequency). Many of the timers used in HPR have the additional characteristic that, under normal conditions, they will be reset or cancelled prior to expiring. This is because the timers are set to wait for an acknowledgement to determine whether retransmission is necessary and under normal usage conditions, there is no need for retransmission since there is not excessive congestion nor are there hardware failures. Some implementations of timer management in software can significantly increase CPU cycle consumption thus degrading overall system processing capability, especially when managing disparate timer classes. For these reasons, timer design is a critical aspect of the HPR implementation.

In general, implementing a timer requires the provision of the following basic primitives:

Start_timer: This primitive allows the insertion of a timer request into the timer data structure so that a specified action can be scheduled at the appropriate time.

Schedule_request: This primitive provides the mechanism to locate the timer request(s) which has expired (when the primitive is invoked) and schedule the specified action. This primitive is usually invoked as part of processing an interrupt from the system clock.

Cancel_request: Timers are often used to provide a backup mechanism to processes waiting for signals which are delayed or lost (For example, a timer to limit the amount of time spent waiting for an acknowledgement before allowing retransmission to begin). However, most often the signal is received before the timer expires which necessitates cancelling or rescheduling the timer request.

Reset_request: This primitive is a logical concatenation of Cancel_request followed by a Schedule_request. It is primarily used for indicating that a periodic acknowledgement has been received and incrementing the duration to wait for the next periodic acknowledgement.

In a well-functioning HPR environment, the reset function can have a significant impact on the performance of the system. The main costs involved are:

Cost of searching the timer chain for the timer to be cancelled.

Cost of removing the TCB (Task Control Block) from the TCB chain.

Cost of inserting (or re-inserting) the timer request (TCB) into the timer data structure.

Cost of synchronizing the insertion and cancellation of TCBs.

An optimal timer implementation for these recurring resets minimizes the combined cost of: 1) finding the timer in the TCB data structure; 2) deleting the timer from the data structure, and 3) inserting the timer into the data structure.

The simplest implementation of a timer structure, as shown by the prior art in FIG. 1, is to have a linked list of TCBs, ordered according to their time of expiration. FIG. 1 shows a task control block (TCB), 101, which represents a timer which expires at the current time ($T_C$). The next TCB, 102, represents a timer which expires x milliseconds from the current time. The TCB 103 represents the event which is scheduled to occur y milliseconds after the event in 102. This chain continues until the last scheduled event in the chain is reached. The sorting cost of this structure is proportional to the number of entries in the list i.e. of order n, O(n), where n is the number of entries in the list. This cost is incurred every time a TCB is added to the linked list since, as shown in FIG. 1, the list must be scanned to determine where the TCB is to be added. To insert an item that is scheduled to expire after $T_{C+X+Y}$ (103) and before $T_Z$ (105), a compare must be made between the value to be inserted (114) and $T_C$; if the value is greater than $T_C$, it must then be compared with the value next in the TCB chain ($T_{C+X}$). This process is continued until the value being inserted is less than the value in the chain. When this occurs, the value is inserted before the compare value. On successive timer expirations, the new timer interval is set according to the value of the first TCB that is to expire, so that there is a timer dispatch with every TCB expiration. This implementation can lead to excessive MIPS being devoted to adding TCBs to the timer data structure as well as dispatching the timer process. Even though the sorting cost can be reduced to O(log(n)) by using data structures such as heaps and left-leaning trees, the cost of timer dispatches (scheduling TCBs) cannot be reduced for this linked list implementation.

As shown in FIG. 2, the clock-tick approach tries to reduce the cost of TCB insertion and the excessive number of timer dispatches by controlling the frequency of timer process dispatches. The period between timer dispatches is the clock-tick interval which is represented as $T_A$. TCBs are inserted into the TCB linked list by adding the TCBs to the end of the TCB chain. There is no searching done prior to insertion, a pointer is utilized which points to the end of the TCB chain. In FIG. 2, $T_f$ (201) was the first TCB inserted into the TCB chain, then $T_g$ (202) was inserted, next $T_h$ (203) was added, then $T_i$ and continuing onward to $T_n$. At predetermined clock-tick intervals, $T_A$, the linked-list of TCBs is searched. Each TCB which expires on or before the current time is dispatched for execution. Any TCB which expires after the current time interval is decremented by the clock-tick interval ($T_A$). Hence, if the clock-tick interval were 5 ms, and the TCB linked-list contained entries expiring at 10 ms, 3 ms, 1 ms, 20 ms; after the next clock-tick, the TCB linked-list would contain the following elements: 5 ms, 15 ms. The cost of updating the TCBs once every clock-tick interval is O(n) since each of the TCBs must be updated. However, the cost of inserting a new TCB is reduced to O(1) since TCBs are always added to the end of the TCB chain. The clock-tick interval is designed to occur less frequently than a TCB insertion and is typically chosen to be a relatively large value to reduce the cost of timer dispatches and the cost of updating the TCBs. This introduces a certain amount of imprecision in the scheduling the actions associated with a TCB since the TCBs are only examined every clock-tick interval. The maximum error that can occur is at most the clock-tick interval.

Although the clock-tick method improves the performance, neither of the above methods solves the performance problems relating to a high frequency of reset commands. A new approach was needed to solve this problem.

OBJECTS OF THE INVENTION

One object of this invention is to minimize the performance impact (both storage and MIPs) as the number of timer reset requests increases. Another objective is to minimize the impact of a timer cancel request on the system.

SUMMARY OF THE INVENTION

This invention discloses an efficient implementation to reset timer requests for a high frequency timer used in a computer network. The invention includes a system and method for using multiple pointers and a finite state machine (FSM) to control the reset and cancel functions of the timer.

Figure 1:
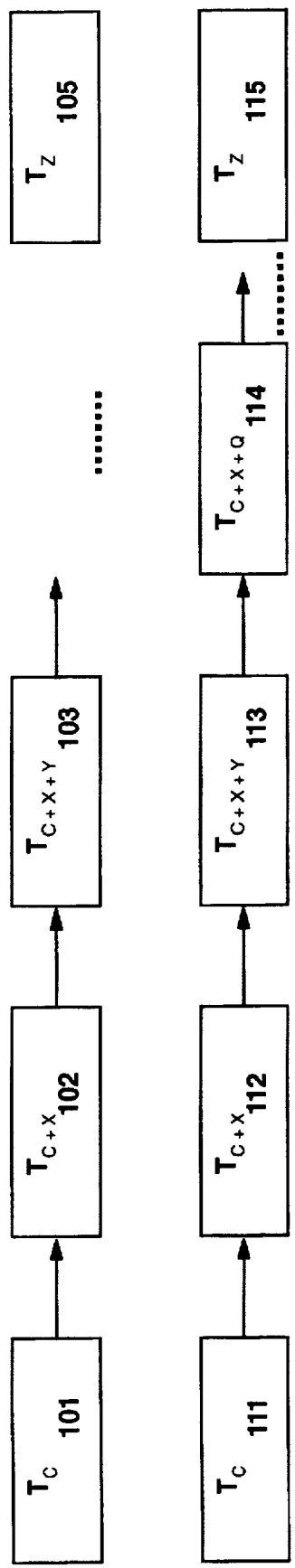
FIG. 1 describes the prior art linked list timer structure.
Figure 2:
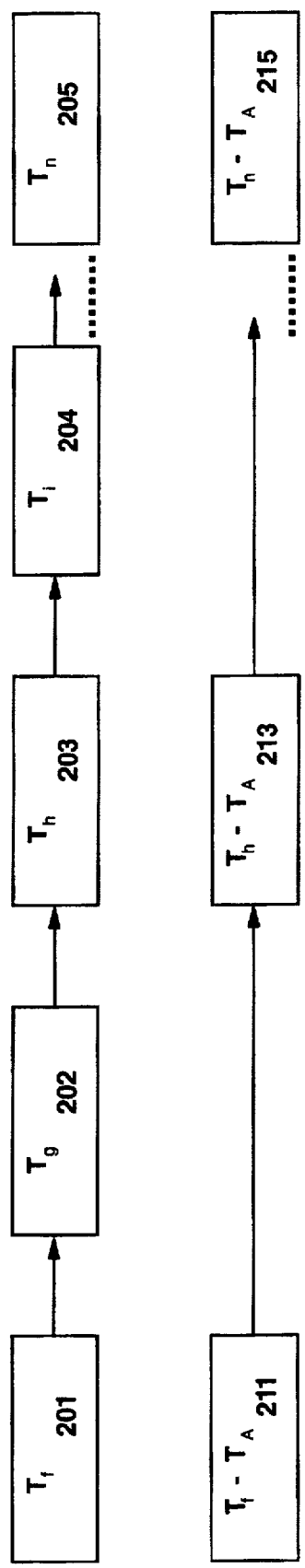
FIG. 2 describes the prior art clock-tick method of timer implementation.
Figure 3:
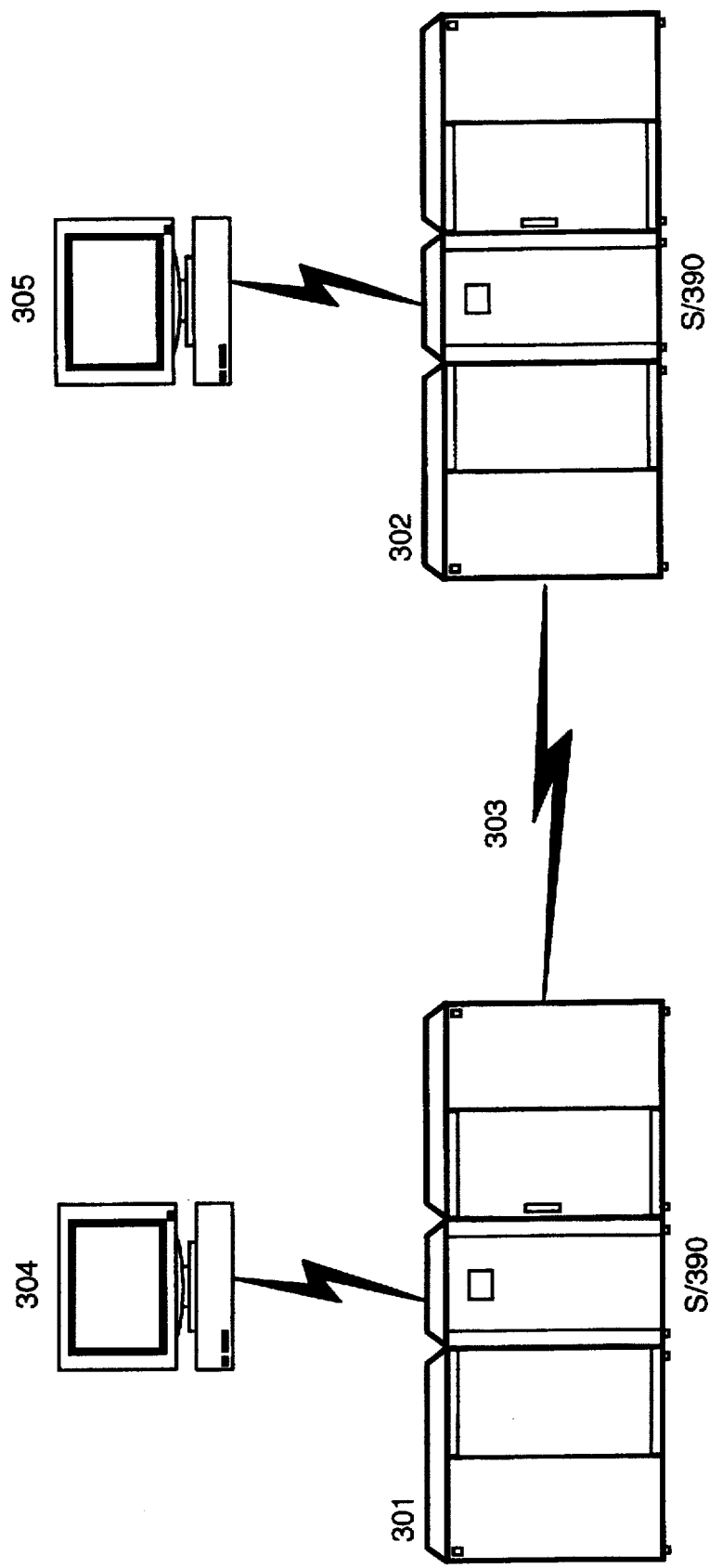
FIG. 3 shows an example of a communications network.

FIG. 3 is an example of a communications network. Two (or more) host computers (301,302) are connected by a communications line (303). Each of the host computers has one or more consoles or terminals (304,305) attached to it. It is obvious to one skilled in the art that this example is an extremely simplistic view of a network. Typical networks are much more complex. This view is for explanation purposes only and is not meant to limit the invention in any way.

Figure 4:
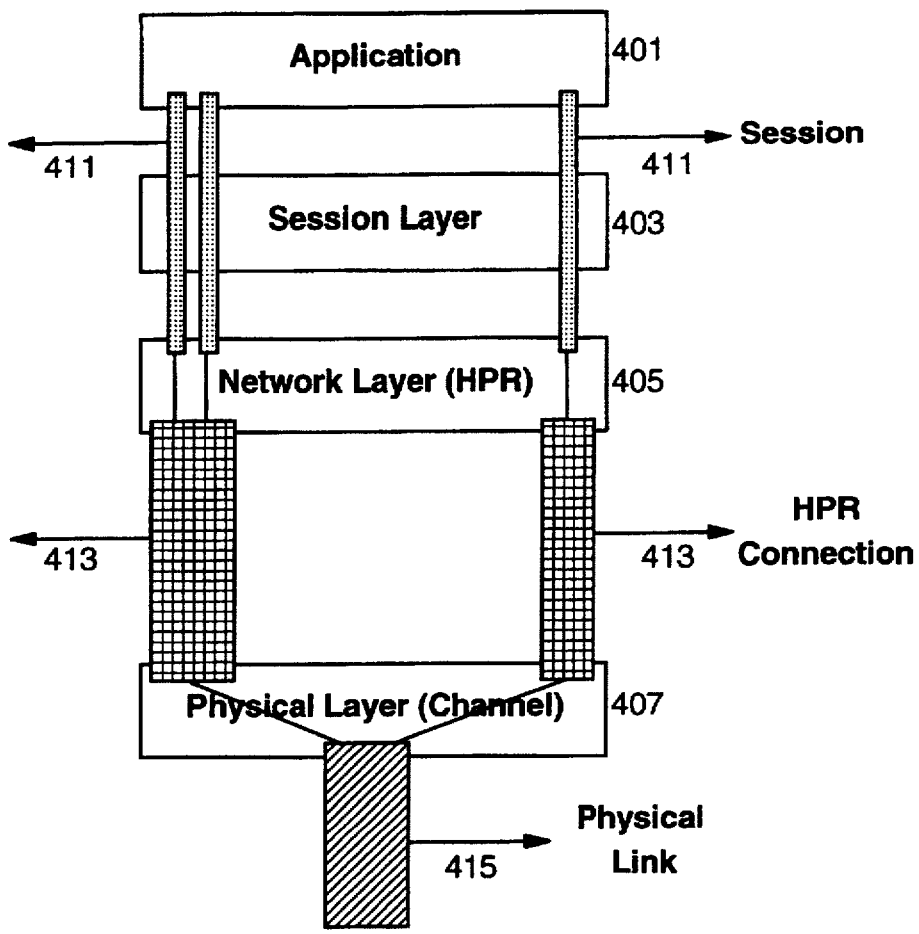
FIG. 4 graphically represents the internal workings of an HPR host computer.

FIG. 4 shows a more detailed view of the interworkings of the HPR communications in the host computer. The application layer (401) communicates with the remote application over one or more sessions (411). The sessions are managed by the session layer (403). One or more sessions can be multiplexed over an HPR connection (413). Multiple HPR connections can exist between this host and other hosts or nodes in the network. The HPR connection represents an end-to-end communication capability between two endpoints in the network. The network layer (405) manages HPR connections. Physical connectivity between the host computer and the adjacent device is managed by the physical layer (407) by using the physical link (415). The end-to-end connection may involve several devices which are physically connected.

The component of HPR responsible for controlling many of these timers is the Rapid Transport Protocol (RTP) component. It significantly improves the performance and ease of implementation if the RTP component does not have to keep track of what timers are outstanding when issuing a new request, thereby reducing the amount of overhead required.

PREFERRED EMBODIMENT

The HPR timers in the preferred embodiment are maintained in a clock-wheel structure as described in a copending application named "A Multi-stage Timer Implementation for Telecommunications Transmission" by Balachandar Rajaraman and Subir Varma hereby incorporated by reference. In brief, the timing wheel structure is a set of pointers to linked lists of TCBs. Each of the pointers represents a predetermined quantity of time. When a task is inserted into the timing wheel, a pointer to its TCB is placed into the linked list for the appropriate slot of time. For example if the timing wheel granularity was 5 milliseconds, and the task to be scheduled was to be executed 15 milliseconds from the current time, then the task would be put in the linked list for the third timer slot. This is represented in FIG. 5.

Figure 5:
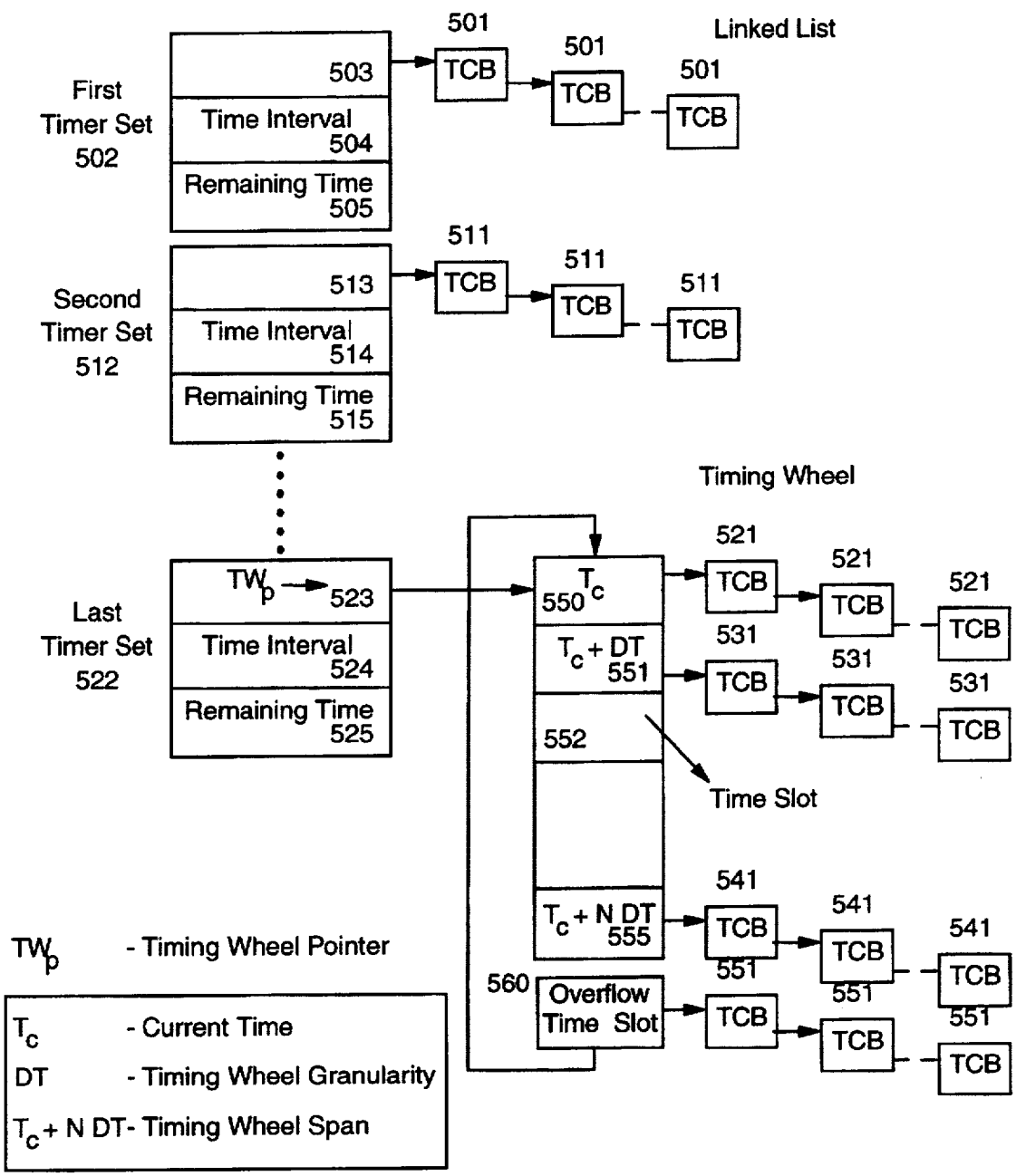
FIG. 5 shows a multiple timer set structure using timing wheel and linked lists structures.

FIG. 5 uses three timer sets for illustration purposes. The first and second timer sets (502 and 512) are organized as a linked list. The first timer set (502) contains a pointer (503) to a linked list of TCBs (501). The second timer set (512) also contains a pointer (513) to a linked list of TCBs (511). Each of the first two timer sets (502 & 512) also contain the time interval that the timer set represents (504 & 514) and an indication of the remaining time (505 & 515). The third timer set (522) in this illustration has an indication of the time interval (524) and the remaining time (525), but rather than having a pointer to a linked list of TCBs, the third timer set (522) has a pointer to a timing wheel (523). The timing wheel is a representation of time increments (called slots) (550–555). Each of these slots represents an instance of the timer expiring. The slots (550–555) contain pointers to TCBs which are scheduled to expire during the increment of time which they represent. There is no significance as to how many or the order of the timing wheels and the linked lists (ie. the entire timing control mechanism could use timing wheels or linked lists or intermix them in any order). In the present illustration, the TCBs represented as 521 are scheduled to expire during the time represented by slot 550.

The RTP process is used in the preferred embodiment as the process which is using the timer. As is understood by one skilled in the art, this invention is applicable to any process or application which sets, cancels and/or resets timers. The RTP process, which requests the timer services, allocates a timer block for each timer type to be supported. The traditional method of doing this is to allocate a TCB and queue that TCB to the timer process queue. If the timer was cancelled prior to expiration, the timer process queue would need to be searched and the desired TCB removed from the queue. To reset the timer once it was scheduled, the timer would need to be "locked" for the duration of the entire operation so that it could not be used, scheduled or cancelled, then it would need to be "freed" once the cancellation was complete. This requires a significant amount of processing power in addition to creating synchronization complexities. The present invention avoids the above-mentioned problems as described below.

Figure 6:
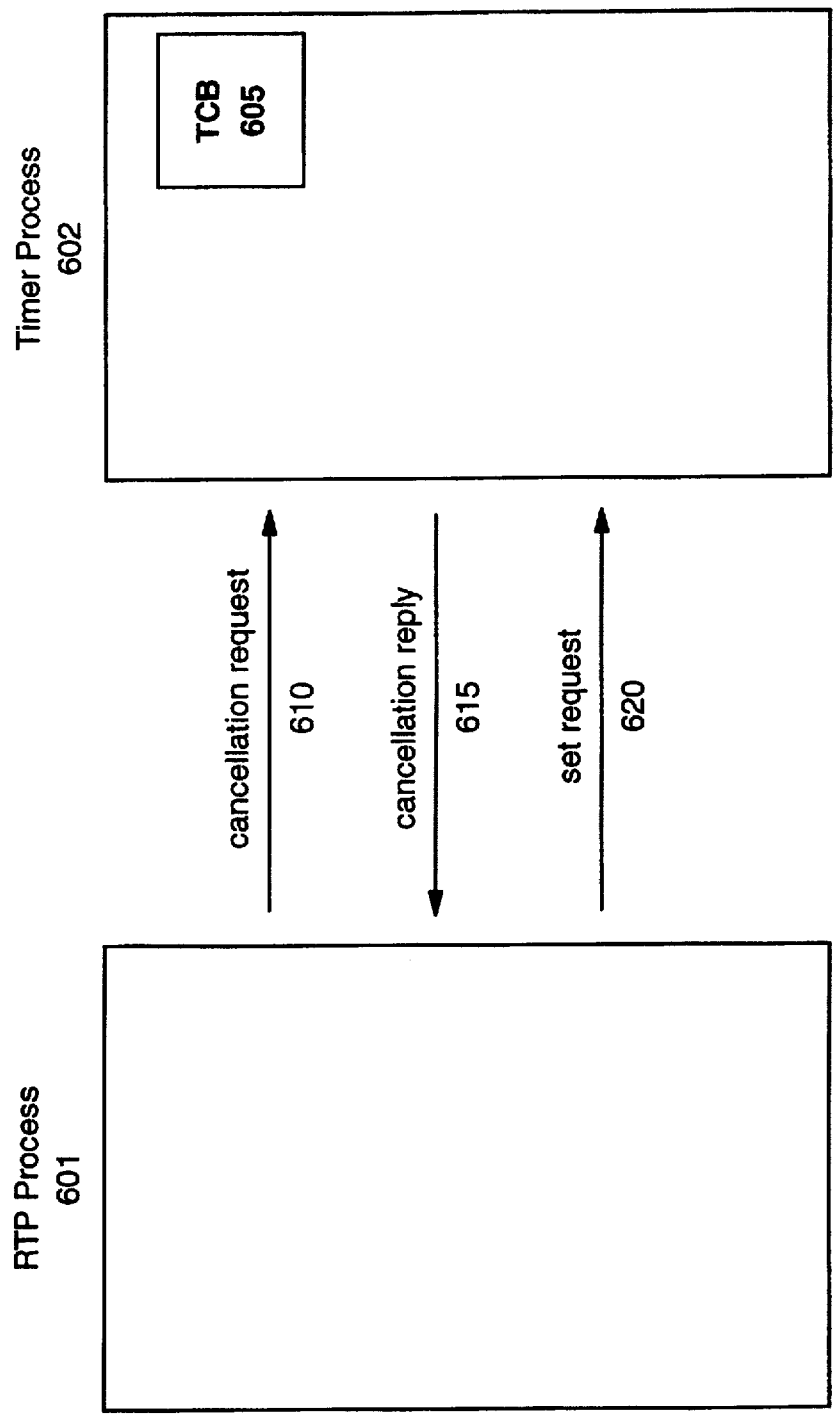
FIG. 6 shows the prior art flow of a cancellation.

In a multi-processor environment the number of competing processes is generally greater than the number of available processors. This multi-processor environment causes problems for the traditional TCB based cancel/set mechanisms. This can be illustrated in the context of RTP's short-request timer. The short-request timer is characterized by typically being cancelled before its time of expiration. Furthermore, it is often necessary to start a new short-request (SRQ) timer (or any other timer) at the point of realizing that the previous one needs to be cancelled. With a single TCB representing the short request timer, the typical sequence of events is as illustrated in FIG. 6. The RTP process (601) is the process in this embodiment requesting, cancelling or resetting the timer. The recipient of these requests, is the timer process (602). The RTP process (601) requests the cancellation of the current SRQ timer (610). This requires queuing a cancellation request to the timer process so that it may return control of the TCB (605) to the RTP process (601). The timer process (602) then acknowledges or replies (615) to the request of the RTP process (601) by sending the TCB (605). Once the RTP receives the returned TCB, it may issue the request for a new SRQ(620). The problem in this prior art is that the RTP must go into a suspended state while waiting for the cancellation (which may be delayed while waiting for the dispatch of the timer process). Additional delay may be introduced while the RTP process again waits to be dispatched after the TCB is queued back to it.

Figure 7:
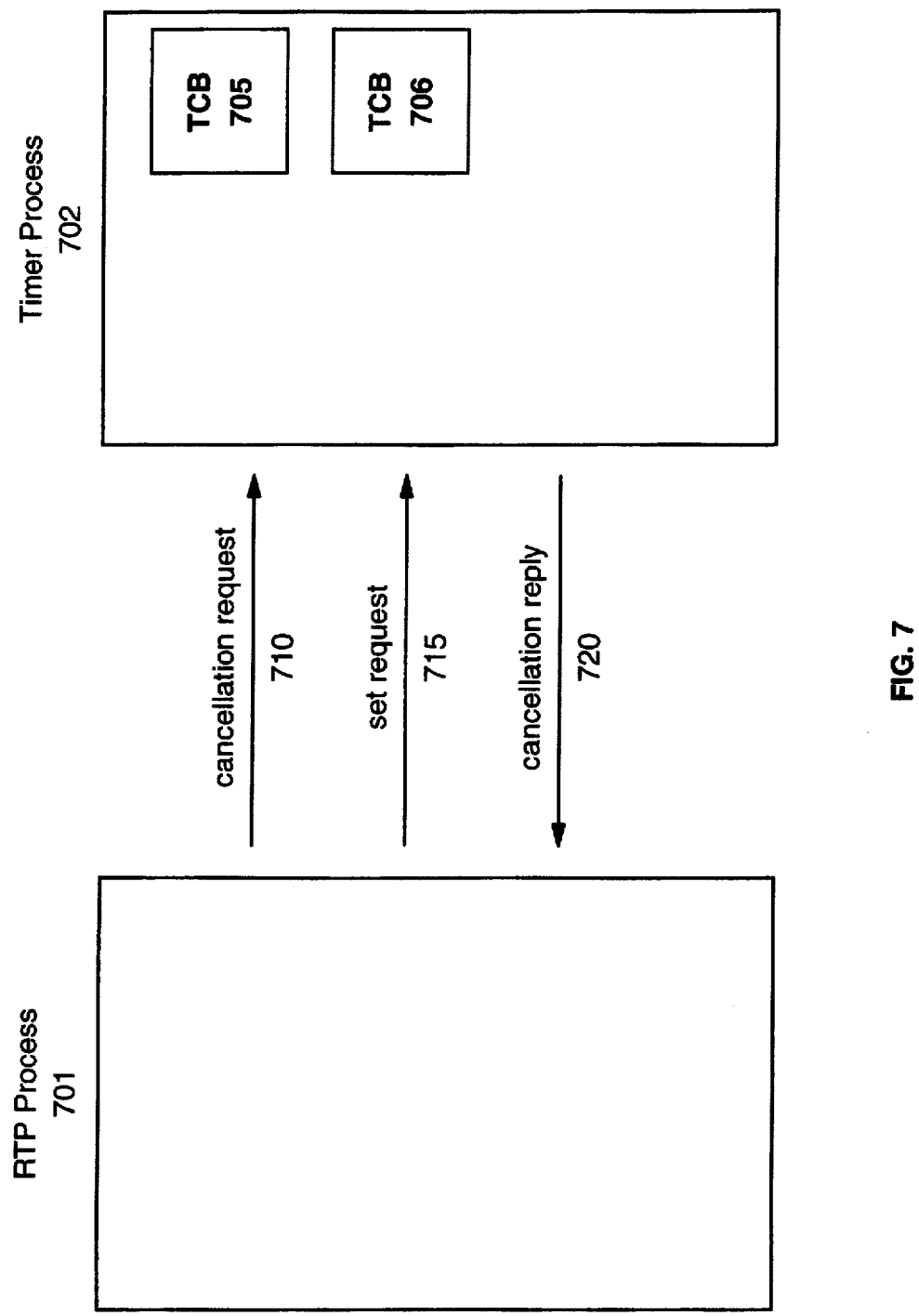
FIG. 7 shows the flow of a cancellation using multiple TCBs.

One possible solution, as shown in FIG. 7, is to allocate a second TCB to be used when the first one is under the control of the timer process. In this scenario, the RTP process (701) sends the cancellation request (710) for the first TCB (705) to the timer process (702). Immediately following the cancellation, the RTP process (701) sends a set request (715) for the second TCB (706) to the timer process (702). This requires that the RTP process maintain a pool of TCBs, rather than just one or incurring the extremely expensive costs of allocating another TCB during execution of the RTP process is avoided, since it is uncertain how many cancellations and sets could be issued prior to their actual execution. As soon as the RTP process issues the cancellation request, it may immediately queue the second TCB requesting the new SRQ timer to the timer process. This introduces additional complexity to the RTP process as it now must track and control which TCB to use under different conditions. While situations requiring three or more outstanding TCB's should be rare, there is no theoretical limit to the number and a system experiencing performance problems could encounter the need for more than three. This becomes an extremely significant problem when using HPR since the large hosts may require over 1000 timers, each allocating and managing multiple TCBs.

The present invention describes a method that allows the user of the timer facility (the RTP processes in this case) to issue a "reset", that is a cancellation (implicit or explicit) and a set for a new duration, without the storage and performance burdened of the management of multiple TCB's. To implement this invention, the concept of a work queue must first be understood. Whenever a process or task is scheduled, it is placed on the work queue independent of whether it currently exists on any other queue. The next time that the timer process receives control (is scheduled time to use the processor), it first searches its work queue and does the actions associated with each of the elements pointed to by the work queue. Once the work queue has been processed, the timer process dispatches the tasks associated with the TCBs that have expired. Once all of the tasks associated with the expired timers have been dispatched, the timer process has completed one execution cycle and it returns to a dormant state until it is time for the timer process to execute again.

Figure 8:
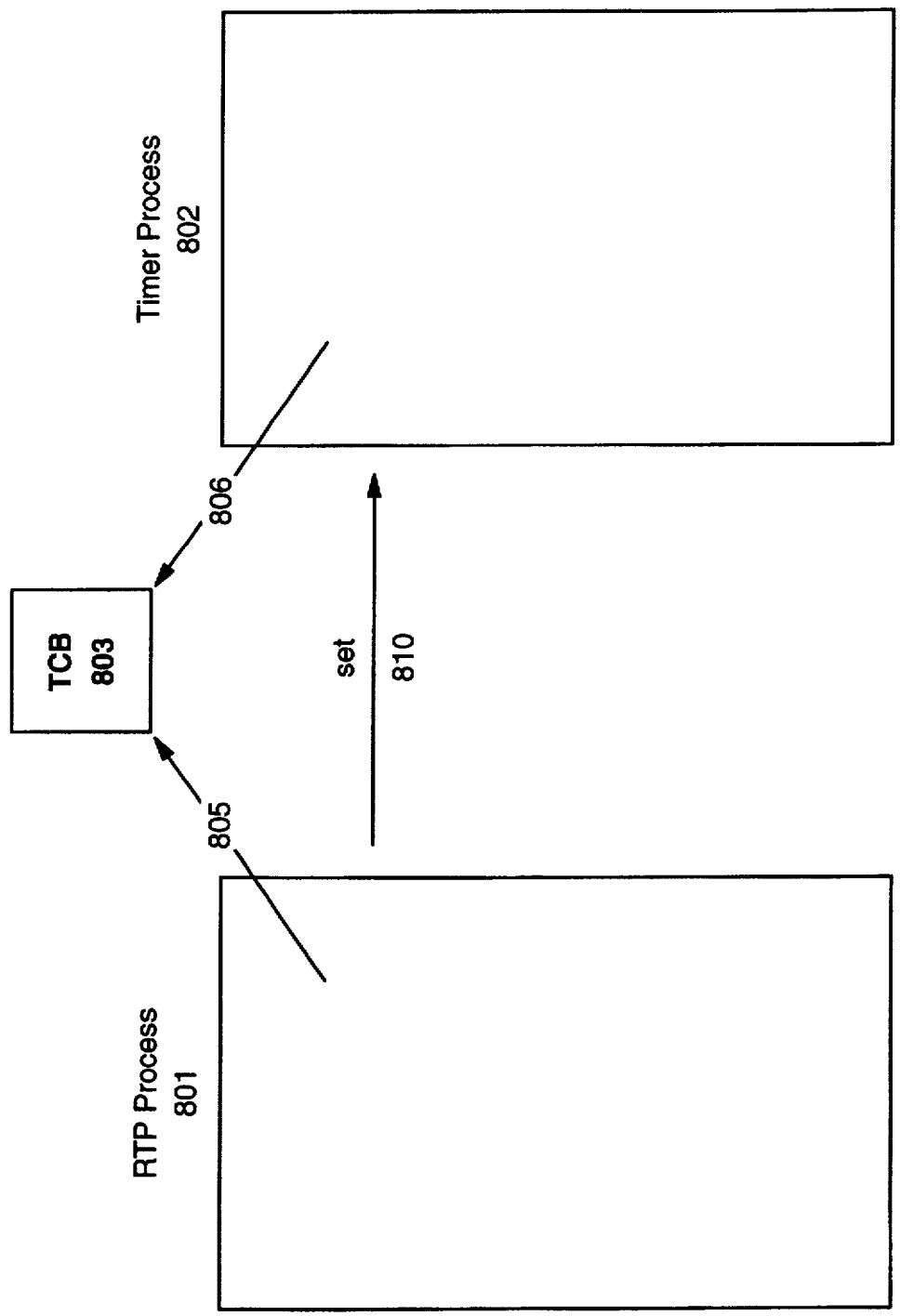
FIG. 8 represents the set flow using the present invention.

FIG. 8 describes the simplified scenario of the present invention. The RTP process (801) maintains a pointer (805) to its TCB (803). When the RTP process (801) issues a set (810), it sends the location of the TCB for that timer to the timer process (802). The timer process then maintains a pointer (806) to the TCB (803). When the timer process (802) determines that the time associated with the TCB (803) has expired, the TCB (803) is scheduled for execution. This sequence is shown in more detail in following diagrams.

Figure 9:
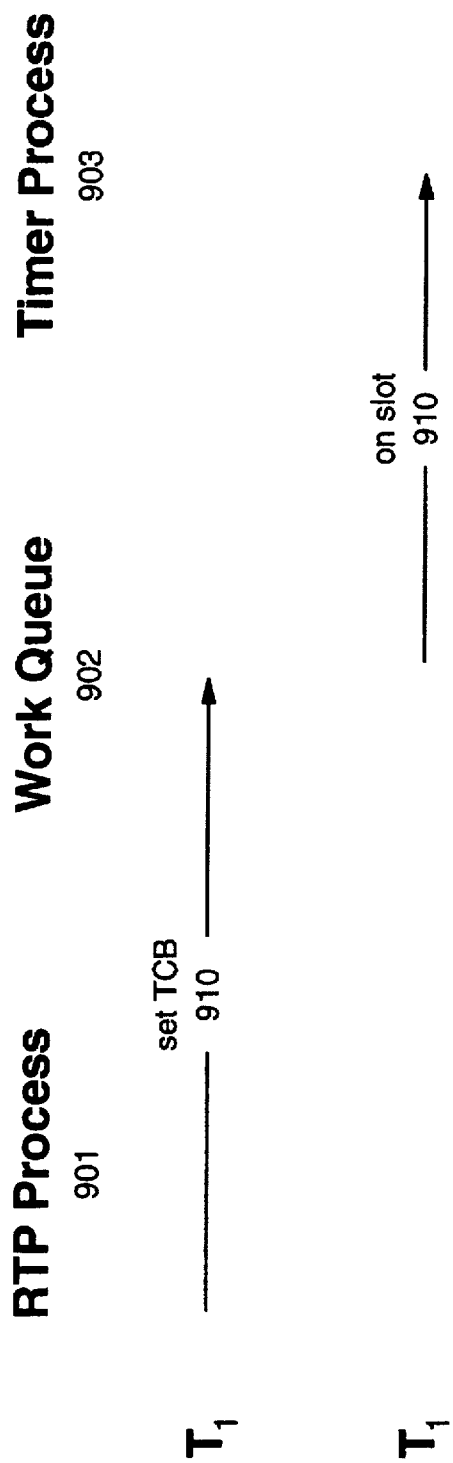
FIG. 9 further represents the flows of a set using the present invention.

FIG. 9 shows a flow diagram of how this process occurs. At time $T_1$, the RTP process (901) issues a set for the TCB labelled TCB1 (910). A pointer to TCB1 is then placed on the work queue (902) and the appropriate bits are set in the TCB to indicate what action is to be taken. At time $T_2$, the timer process (903) gets control. The work queue (902) is processed which causes the pointer to TCB1 to be placed into its appropriate slot in the timing wheel (911). The timer process (903) then dispatches all of the tasks associated with the current timing wheel slot.

Figure 10:
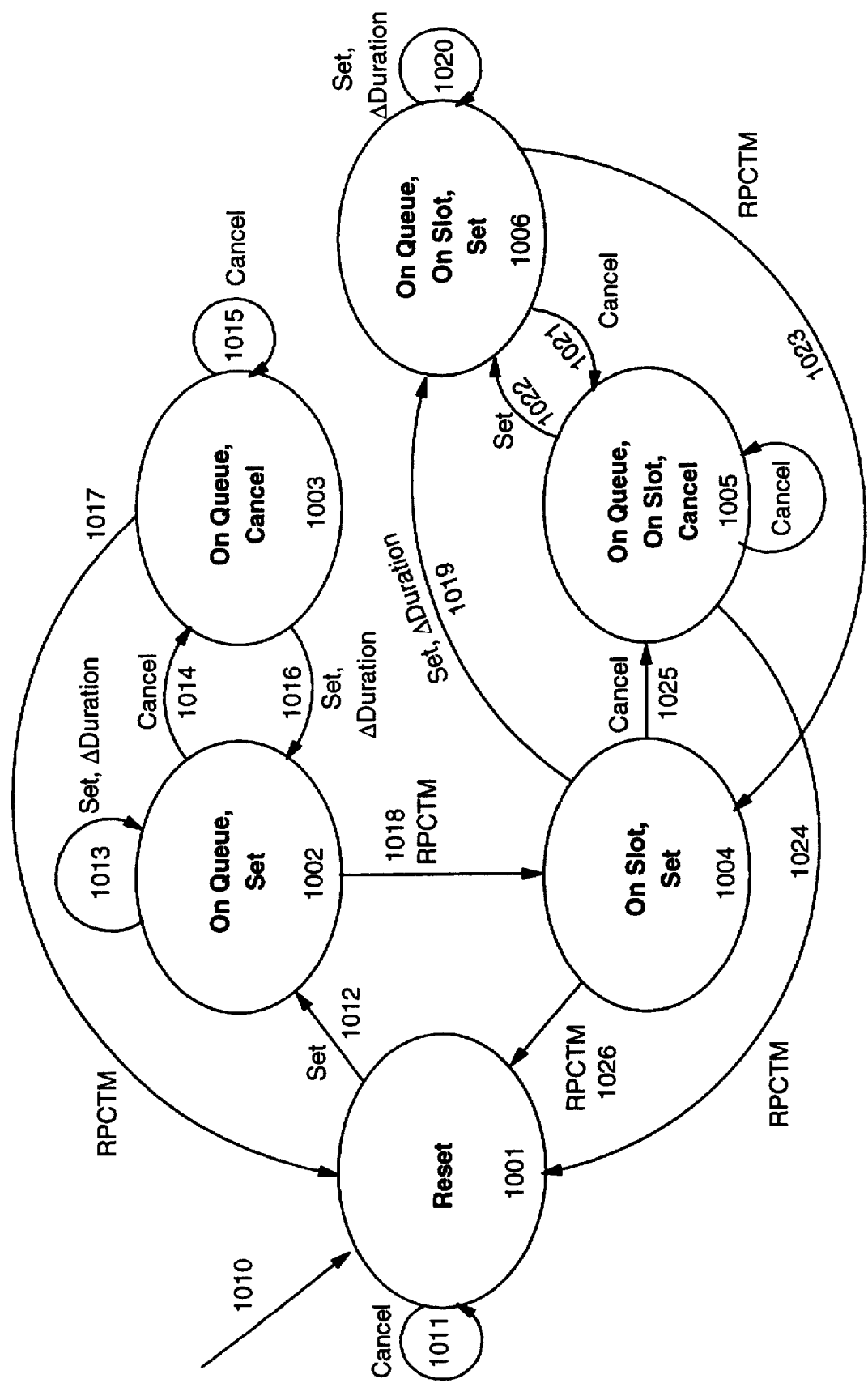
FIG. 10 shows the states of the finite state machine (FSM) used in the preferred embodiment of the present invention.

FIG. 10 depicts the finite state machine (FSM) which acts upon the appropriate bits in the TCB to determine what actions are to be taken when the work queue is processed. The entry point (1010) to the FSM is at the RESET state (1001). From the RESET state (1001), a cancel can be issued (1011). If the cancel (1011) is issued, the bits in the TCB are left unchanged and will continue to represent the RESET state. If a set (1012) is received when the FSM is in the RESET state, the bits in the TCB are changed to represent the state of ON QUEUE, SET (1002). This state means that the TCB is placed on the work queue and the action to be taken when the work queue is processed is that the TCB is to be placed in a timer slot. If, while the FSM is in the ON QUEUE, SET (1002) state, a second set for a different duration for the same TCB is received (1013), the FSM remains in the ON QUEUE, SET (1002) state with a new expiration time indicated. If a cancel (1014) is received while the FSM is in the ON QUEUE, SET state, the FSM goes to an ON QUEUE, CANCEL (1003) state. This means that the indication on the work queue for that TCB is changed from set to cancel. Still no processing of the work queue has occurred to this point. If the FSM is in the ON QUEUE, CANCEL (1003) state and receives a cancel (1015), nothing is changed. If the FSM is in the ON QUEUE, CANCEL (1003) state and a set is received (1016), the FSM returns to the ON QUEUE, SET (1002) state with the appropriate expiration time indicated. If the FSM is in the ON QUEUE, CANCEL (1003) state and the timer control process executes (1017), the FSM returns to the RESET (1001) state. If the FSM is in the ON QUEUE, SET (1002) state and the timer control process executes (1018), the FSM goes to the ON SLOT, SET (1004) state. The ON SLOT, SET (1004) state means that the TCB has been inserted into a timer slot with a specific time in which the TCB will expire and be scheduled to execute. If the FSM is in the ON SLOT, SET (1004) state and receives a change or expiration (1019) (ie. another set request for a different time of expiration), the FSM goes to the ON QUEUE, ON SLOT, SET (1006) state. This means that the TCB is on the work queue while also in a expiration time and that when the work queue is processed, the slot should be changed to the appropriate time expiration. If the FSM is in the ON QUEUE, ON SLOT, SET (1006) state and another set for a different time of expiration (1020) is received, the TCB is once again queued to the work queue with the new duration. If a cancel (1021) is received when the FSM is in the ON QUEUE, ON SLOT, SET (1006) state, the FSM moves to the ON QUEUE, ON SLOT, CANCEL (1005) state. This state means that the TCB has been inserted into a slot, but is now placed on the work queue to be cancelled. When the work queue is processed, the TCB will be removed from the slot (prior to the timing wheel being processed). If the FSM is in the ON QUEUE, ON SLOT, CANCEL (1005) state and a set (1022) is received, the FSM is returned to the ON QUEUE, ON SLOT, SET (1006) state with the appropriate expiration time indicated. If the FSM is in the ON QUEUE, ON SLOT, SET (1006) state and the timer control process executes (1023), the FSM is processed from the work queue and is returned to the ON SLOT, SET (1004) state. If the FSM is in the ON QUEUE, ON SLOT, CANCEL (1005) state and the timer control process executes (1024), the TCB is removed from the timing wheel and returned to the RESET (1001) state. If the FSM is in the ON SLOT, SET (1004) state and a cancel (1025) is received, the TCB is queued to the work queue with the ON QUEUE, ON SLOT, CANCEL (1005) state. If the FSM is in the ON SLOT, SET (1004) state and the timer control process executes (1026) for the particular slot, this means that the TCB is in the timer slot which should be scheduled during this execution of the timer. The task is scheduled to execute and the FSM is returned to the RESET (1001) state to await a future set operation. This describes the states in the preferred embodiment. It should be obvious to one skilled in the art that, if multiple processes were directing the state of the FSM in the management of a single TCB (in the terminology of the preferred embodiment it would be multiple RTP processes), then additional states may need to be added to the FSM.

Figure 11:
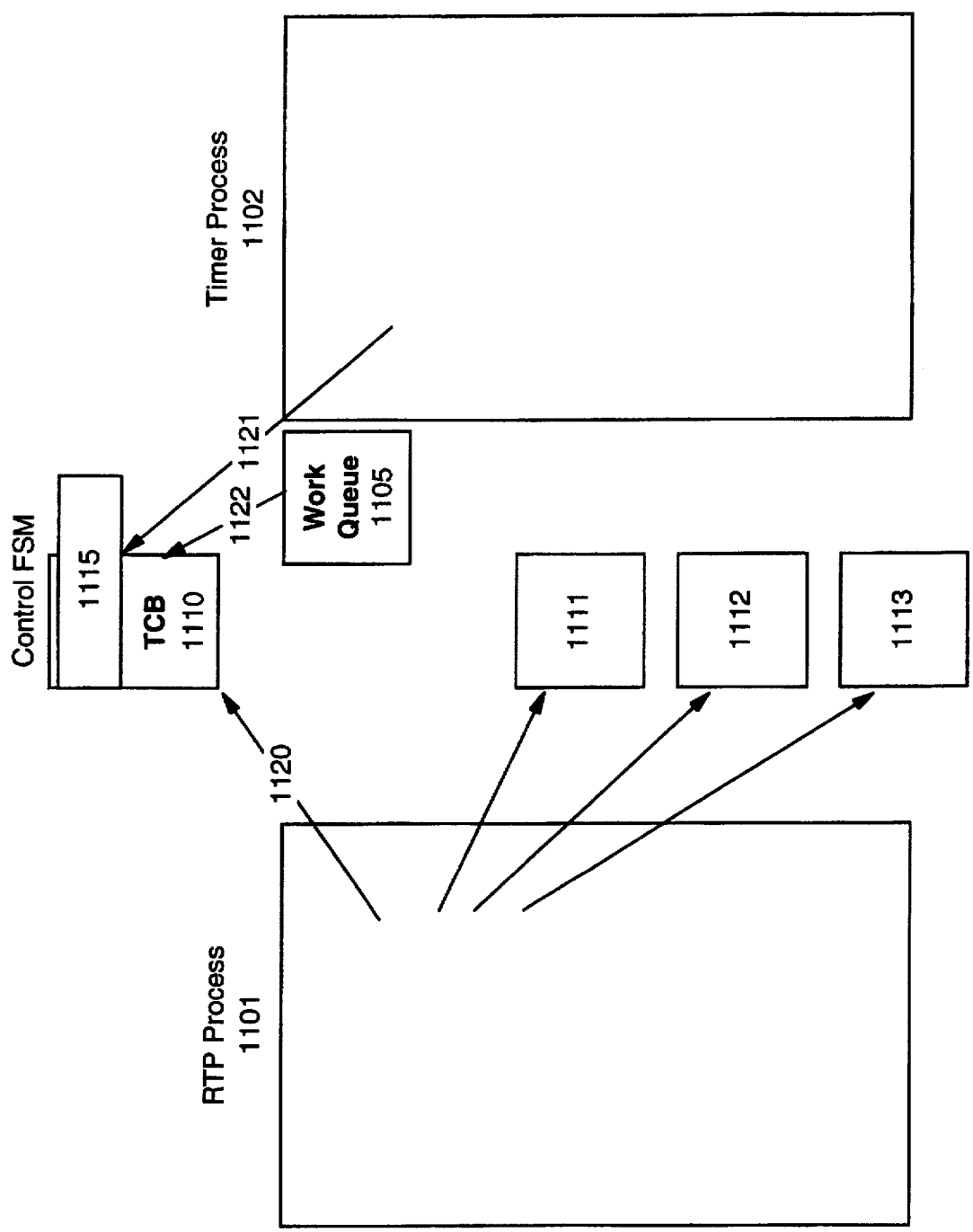
FIG. 11 Depicts a visual description of the scheduling process of the preferred embodiment.

FIG. 11 depicts a visual description of the scheduling process. A TCB (1110–1113) is created for each type of timer requested by a specific process, in the preferred embodiment, this process is the RTP process. The RTP process (1101) supports four types of timers (in the preferred embodiment they are liveness, re-fifo, short request and burst). One skilled in the art will readily see that this invention is not limited to the RTP process or to HPR in general. The interaction with each of the TCBs is the same, therefore only one of the TCBs (1110) will be used as an example. The RTP process (1101) has a pointer (1120) to the TCB (1110). When the RTP process (1101) needs to schedule the timer, it issues a set command to the work queue (1105) by setting the appropriate bits in the control FSM (1115) and setting a pointer in the work queue (1122) which points to the TCB (1110). When a clock cycle has occurred and the work queue (1105) is processed by the timer process (1102), a pointer (1121) is put into a slot in the timing wheel by the timer process (1102) which points to the TCB (1110) and the appropriate bits in the control FSM (1115) are set to reflect the state of the TCB. It is a significant performance improvement with this invention than neither the timer process nor the RTP process requires a traditional lock on the TCB for any significant duration of time and the lock that is used is easy to obtain and release. The method of ensuring that neither process receives incorrect information or is changing the TCB when it shouldn't is a 'mini-lock' using the 'test and set' instruction. This 'mini-lock' is only held for 10 or 12 processor instructions. It is an order of magnitude less expensive to invoke than a traditional lock and multiple orders of magnitude less expensive to invoke than an allocation of another TCB.

Figure 12:
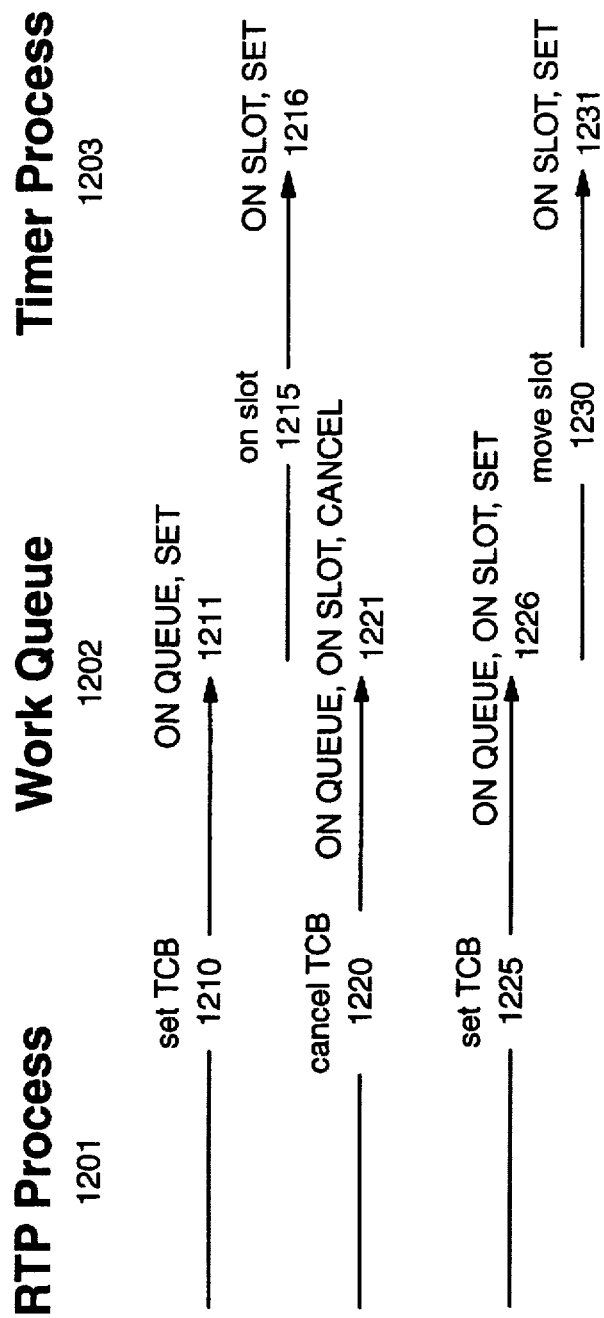
FIG. 12 shows the relative simplicity of a cancel and set using the present invention.

The flow diagram of FIG. 12 shows the relative simplicity of a cancel and set instruction when using the present invention. To set the timer, the RTP process (1201) issues a "set" to the work queue (1202) with the address of the TCB to be acted upon. This results in the FSM state of ON QUEUE, SET (1211). When the timer process (1203) runs, the element is moved from the work queue and put on the appropriate timing wheel slot (1215) with the resulting FSM state of ON SLOT, SET (1216). If the RTP process then desires to cancel the TCB, a cancel (1220) is issued and placed on the work queue (1202) resulting in the FSM state of ON QUEUE, ON SLOT, CANCEL (1221). This means that the item of work is on a slot scheduled to execute, but a cancel request for the same TCB is also on the work queue. Since the work queue is always processed before the timing wheel slots, this item will be removed from the slot prior to being executed. If the RTP process (1201) then sets (or resets) the same TCB (1225) prior to the timer process running, the FSM state is changed to ON QUEUE, ON SLOT, SET (1226) without the cancel ever being processed by the timer process. This FSM would just be modified to reflect the current change in state. If the timer process (1203) is then executed, a pointer to the TCB would be moved to the timing slot represented by the new time and the FSM state would change to ON SLOT, SET (1231). If no other changes were made until the slot from which the TCB was pointed to was scheduled for expiration, the task represented by the TCB would run when the timing wheel slot expired.

What is claimed is:

1. A timing control mechanism for optimizing timer operation, comprising:

a control process;

a timer process;

a timer structure;

a work queue;

means in said control process for issuing set, cancel and reset commands for one or more tasks, each of said tasks being associated with a unique control block, wherein each of said control blocks includes an area where bits are stored representing different states of a finite state machine;

means for placing a pointer to the control block on the work queue in response to said command issuance, if said work queue does not already have a pointer to said control block;

means for updating said control block pointed to from said work queue in response to said command issuance, when said work queue already has a pointer to said control block; and means for executing said timer process wherein said execution entails first processing said control blocks pointed to by said pointers on said work queue, then processing said timer structure.

2. A computer network, comprising:

two or more computers;

telecommunications links connecting said two or more computers;

a timing control mechanism for optimizing timer operation related to using said telecommunications links, said timing control mechanism comprising:

a work queue;

one or more timing structures;

a timer process;

a control process;

means for scheduling a task by placing an entry representing said task onto said work queue;

means for cancelling a task by updating said entry on said work queue, when said work queue contains an entry representing said task;

means for resetting a task by updating said entry on said work queue, when said work queue contains an entry representing said task; and means for processing said entries from said work queue prior to processing any of said timing structures.

3. A computer, comprising:

one or more telecommunications links;

means for transmitting over said links, said means for transmitting utilizing a timer control mechanism for optimizing timer operation, said timer control mechanism comprising:

a timer structure;

a work queue;

a timer process;

a control process;

means in said control process for queuing elements on said work queue;

means for updating said queued elements on said work queue; and means in said timer process for processing said elements from said work queue prior to processing said timer structure.

\* \* \* \* \*